(12) United States Patent
Lovell et al.

(10) Patent No.: US 8,573,275 B2
(45) Date of Patent: Nov. 5, 2013

(54) METHOD AND APPARATUS FOR DETECTING EXPOSED METAL CORDS IN AN ELASTOMERIC STRIP

(75) Inventors: David Ray Lovell, Topeka, KS (US); Jingfei Zhang, Dalian (CN)

(73) Assignee: The Goodyear Tire & Rubber Company, Akron, OH (US)

( * ) Notice: Subject to any disclaimer, the term of this patent is extended or adjusted under 35 U.S.C. 154(b) by 973 days.

(21) Appl. No.: 12/185,256

(22) Filed: Aug. 4, 2008

(65) Prior Publication Data

US 2008/0308232 A1    Dec. 18, 2008

Related U.S. Application Data

(62) Division of application No. 11/054,013, filed on Feb. 9, 2005, now Pat. No. 7,441,318.

(51) Int. Cl.
*B29D 30/08*    (2006.01)

(52) U.S. Cl.
USPC ...................................... 156/406.4

(58) Field of Classification Search
USPC ...................................... 156/406.4
See application file for complete search history.

(56) References Cited

U.S. PATENT DOCUMENTS

| | | | |
|---|---|---|---|
| 3,248,979 A * | 5/1966 | Brooks, Jr. ........................ 83/58 |
| 4,457,149 A * | 7/1984 | Weinzinger et al. ............. 72/8.6 |
| 4,769,104 A | 9/1988 | Okuyama et al. |
| 4,961,813 A | 10/1990 | Bailey |
| 4,976,807 A | 12/1990 | Irie et al. |
| 5,582,664 A | 12/1996 | Sergel et al. |
| 5,720,837 A * | 2/1998 | Regterschot et al. ......... 156/123 |
| 6,796,354 B2 | 9/2004 | Nauta et al. |
| 6,834,823 B2 | 12/2004 | Nauta et al. |
| 2003/0141021 A1 | 7/2003 | Nauta |

FOREIGN PATENT DOCUMENTS

| | | |
|---|---|---|
| AU | 57987294 B | 3/1994 |
| DE | 10037944 A1 | 8/2000 |
| EP | 0649730 B1 | 10/1994 |
| EP | 0678375 A1 | 1/1995 |
| JP | 11256359 | 9/1999 |
| JP | 11256359 A * | 9/1999 |
| JP | 2003011244 | 1/2003 |
| JP | 2003011244 A * | 1/2003 |
| SU | 1525023 A * | 11/1989 |

* cited by examiner

*Primary Examiner* — Philip Tucker
*Assistant Examiner* — Vicki Wu
(74) *Attorney, Agent, or Firm* — David L King

(57) ABSTRACT

A method and apparatus for detecting exposed and partially separated metal cords 17 in a cut end of a metallic cord reinforced strip 17 includes the steps of conveying and cutting the strip 17 and separating the cut ends and passing the conveyed cut strip 17 past a sensor means 40 for detecting any exposed partially separated metal cords or filaments. The preferred sensor means 40 includes a pair of closely spaced electrically conductive rollers 41, 42, a power source connected to one of the other rollers 41 or 42. When an exposed wire 26 touches both rollers 41 and 42 a circuit is closed giving indication of an exposed wire cord condition.

2 Claims, 3 Drawing Sheets

METHOD AND APPARATUS FOR DETECTING EXPOSED METAL CORDS IN AN ELASTOMERIC STRIP

RELATED APPLICATIONS

This application is a divisional of co-pending U.S. patent application Ser. No. 11/054,013 filed on Feb. 9, 2005 entitled "A Method and Apparatus for Detecting Exposed Metal Cords in an Elastomeric Strip".

FIELD OF THE INVENTION

The invention relates to the manufacture of tires generally and more specifically to the cutting, splicing and assembling of metallic cord reinforced ply or belt structures for tires.

BACKGROUND OF THE INVENTION

Belts or breaker structures for tires are made of cord reinforced elastomeric or rubber plies or layers formed in strips. The cords are positioned generally parallel to each other and are spaced uniformly by a distance occupied by the elastomeric or rubber material commonly referred to as the "rivet". The rubber or elastomer is unvulcanized during its manufacture and is generally sticky or tacky and is therefore easy to deform and to adhere to itself.

The cords of belt and breaker plies axe typically metallic having brass or coated steel filaments stranded to form the cord.

The manufacture of belts or breaker strips is described in US patent publication US2003/0141021A. A belt or breaker strip is made by cutting at an angle θ a continuous roll of rubber material, having reinforcement cords in the longitudinal direction. The cut pieces are in the shape of a parallelogram, having, a triangular leading tip and a triangular trailing tip. The separate strips are transported to a splicing table where the trailing and leading ups are butt spliced together to form a continuous strip having all the cords oriented at the cut angle θ.

In the manufacture of a bell for a lire these strips are cut and spliced to a predetermined width to form a bell layer. Each belt layer in a tire generally has a distinct belt width and each successive layer has the cords oriented oppositely relative to the adjacent layer. Typically two layers sometimes three or four layers are used. Historically belt layers were always paired, but that is not always the case in modern tires. The belt layers restrict the growth of the underlying radial carcass plies in a radial tire. Radial tires have the ply cords angled at about 90° relative to the tires center plane. The belt layers have the cords oriented at 17° to 25° typically. Bias tires employ two or more carcass cross-plies having the cords oriented oppositely in adjacent layers between 50° and 65° generally. They use breakers in place of belts and these breakers have cord angles typically 40° to 65° and are directionally oppositely oriented between adjacent layers. For the purposes of this invention the use of the invention does not depend on the type of belt or breaker layer and in some applications the invention can be used in radial carcass plies as will be shown.

A primacy goal in tire construction is building a tire with great uniformity. The manufacture of these cord reinforced strips and applying the cut strips to a tire building drum must be accomplished in a fashion that is consistently uniform to insure a manufactured tire is made to the highest standards.

Modern tire building is very equipment sensitive and involves a high degree of automated assembly. Automated assembly has the advantage of being reliably consistent and fast.

One area of lire building that has been difficult to automate is the random and extremely low occurrence of a "wild wire". A "wild wire" as used herein is a wire filament or cord located at a cut end of a belt breaker or carcass ply that is partially separated from the rubber and thus sticking out from the layer or strip.

The occurrence of wild wires is more likely in steel cords than in textile or synthetic cords. The most likely reason being the synthetic cords when embedded in the hot rubber tend to relax and have very little residual stress or memory tending to act like a spring, pulling the cord away from the rubber. Metallic, cords, however, can retain some residual stress or spring-like memory. Thus occasionally if the cutting knife cuts into the cord, scraping the rubber material away on one side and pulling the cord in the direction of the cut slightly, then a portion of the wire can spring away from the layer at the cut end. Similarly if a cutting knife cuts over a cord without severing the cord, then as the strips are separated the cord will remain with that strip layer that is most strongly adhering to the cord pulling the cord from the other portion resulting in a "wild wire".

One of the advantages of a human or manual application of such a belt layer is that wild wires are readily observable and repairable. The preferred method of repair is to simply remove the wild wire and splicing the belt layer. This leaves the bell perfectly usable and has no detrimental effect on the performance or uniformity of the tire. In an automated assembly wherein the belt layers are applied by servers the equipment may not detect a wild wire. The occurrence of a wild wire in a finished tire may not cause an issue, however, if the ends of such a wire get directed towards the air impervious innerliner then the wire can penetrate the innerliner in a crown area of the tire and can cause the tire to slowly lose air over time. Naturally it is in the tire manufacturers best interest not to sell pneumatic tires that won't hold air, accordingly it is very desirable to avoid "wild wires" altogether. Modern tire building equipment particularly belt splicers and servers have been designed to minimize such occurrences. Prior art patents EP0649730B1; U.S. Pat. Nos. 5,720,837; 5,582,664; 4,976,807; 4,961,813 and U.S. Pat. No. 4,769,104 all are representative examples of equipment used to create belts or apply such belts to tire building equipment.

Nevertheless it is in those rare occurrences of a belt with a "wild wire" being made that a simple and reliable detection system would be desirable that would alert the tire builder or equipment operator that a "wild wire" is present.

Such a detection system would enable the tires to be built in a more automated and reliable way while providing an in-line inspection system that would eliminate the "wild wire" from being processed into a finished tire.

SUMMARY OF THE INVENTION

A method of detecting an exposed and partially separated metallic wire cord or filament in a cut end of a metallic cord reinforced elastomeric strip is disclosed. The method has the steps of conveying a continuous strip on a conveyor means; cutting the strip substantially along a path parallel to the metallic cords; separating the cut ends of the strip; passing the conveyed cut strip by a sensor means for detecting any exposed and partially separated metallic wire cords or filaments; sensing any partially separated and exposed metallic wire cords or filaments; signaling the equipment or operator to stop the conveying strip; and removing from or reattaching to the elastomeric material the partially separated metallic cord or filament in the elastomeric strip.

The step of sensing includes passing the strip past two closely spaced rollers, a first roller connected to an electric power source and a second roller connected to a control switch or computer. The partially separated metallic wire contacts both rollers to close a circuit sending an electrical signal to the control switch or computer. The sensor first and second rollers are oriented parallel at an angle of 90° or less relative to the strip length and direction of conveyance and spanning the entire width of the strip and are oriented greater than 15° relative to embedded cords To perform the above method, an improved metal cord reinforced elastomeric strip cutting and feeding apparatus, is disclosed. The apparatus has a conveying means for conveying the strip longitudinally to a tire drum; a cutting means for cutting the elastomeric strip across the entire width of the strip to form a belt breaker or ply component; and a sensor means for detecting any metal cords or filaments that are exposed and partially separated from the cut ends of the strip.

The sensor means for detecting includes a pair of electrically conductive rollers, including first roller and second roller; a power source connected to said first roller; a switch or signal device connected to said second roller, and wherein an exposed and partially separated metallic wire cord or filament contacts said first and second rollers simultaneously an electric circuit is closed activating said switch or signal device. The first and second rollers are closely spaced, but gapped to open the circuit. The power source is a battery. The rollers may be spring loaded to move into contact with the conveyor and move away from said conveyor as the cut strip passes.

Definitions

"Axial" and "axially" means the lines or directions that are parallel to the axis of rotation of the tire.

"Bead" or "Bead Core" means generally that part of the tire comprising an annular tensile member, the beads are associated with holding the tire to the rim being wrapped by or anchored to ply cords and shaped, with or without other reinforcement elements such as flippers, chippers, apexes or fillers, toe guards and chafers.

"Belt Structure" or Reinforcing Belts" means at least two annular layers or plies of parallel cords, woven or unwoven, underlying the tread, unanchored to the bead, and having both left and right cord angles in the range from 17.degree. to 30.degree. with respect to the equatorial plane of the tire.

"Breakers or Breaker Reinforcement" is similar to a belt reinforcement, however, the cord layers are generally oriented at about the same angle as the underlying carcass plies; generally, these reinforcing layers are found in bias ply tires.

"Bias Ply Tire" means that the reinforcing cords in the carcass ply extend diagonally across the tire from bead-to-bead at about a 25-65.degree. angle with respect to the equatorial plane of the tire, the ply cords running at opposite angles in alternate layers.

"Carcass" means a laminate of tire ply material and other tire components cut to length suitable for splicing, or already spliced, into a cylindrical or toroidal shape. Additional components may be added to the carcass prior to its being vulcanized to create the molded tire.

"Circumferential" means lines or directions extending along the perimeter of the surface of the annular tread perpendicular to the axial direction.

"Equatorial Plane (EP)" means the plane perpendicular to the tire's axis of rotation and passing through the center of its tread.

"Inner" means toward the inside of the tire and "outer" means toward its exterior.

"Innerliner" means the radially innermost air impervious layer used in making a tubeless tire.

"Lateral Edge" means the axially outermost edge of the belt as defined by a plane parallel to the centerplane and intersecting the outer ends of the axially outermost edges along the longitudinal direction.

"Leading End" refers to a cut end portion of part of the belt that is closest to the discharge end on the conveyor in the direction of conveyance.

"Radial" and "radially" means directions radially toward or away from the axis of rotation of the tire.

"Radial Ply Tire" means a belted or circumferentially-restricted pneumatic tire in which the ply cords which extend from bead to bead are laid at cord angles between 65. degree, and 90.degree. with respect to the equatorial plane of the tire.

"Trailing End" refers to a cut end portion or part of the belt that is farthest from the discharge end of the conveyor in the direction of conveyance.

BRIEF DESCRIPTION OF THE DRAWINGS

The invention will be described by way of example and with reference to the accompanying drawings in which.

DETAILED DESCRIPTION OF THE INVENTION

Figure 1:
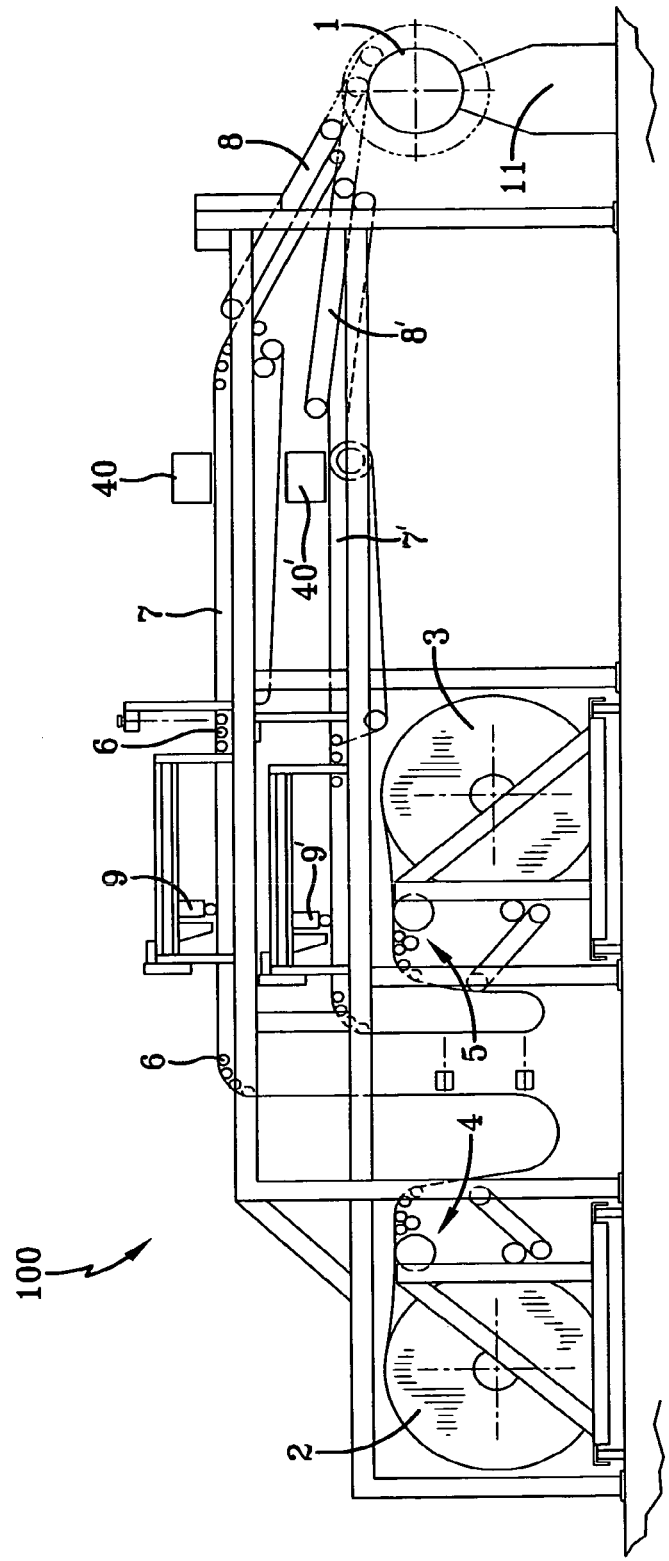
FIG. 1 is a plan view of an exemplary apparatus according to the present invention.

With reference to FIG. 1 an exemplary apparatus for forming cut lengths of belt strips is shown. This bell strip feeding apparatus is manufactured by VMI EPE Holland B.V. and is exemplary of the type of equipment to which the present invention can be used to modify the equipment providing an improved detection method. The exemplary apparatus as shown has a means for adjusting at least one side of the cut belt strip to a reference side and its basic construction and operation is briefly described below and in greater, more specific detail in U.S. Pat. No. 5,720,837.

The belt strip feeding apparatus, represented schematically in FIG. 1, for feeding a belt strip to a rotating building drum 1 comprises two exchangeable supply reels 2 and 3 for containing belt material. The belt material is unwound by means 4 and 5 from the supply reels 2 and 3, respectively, and conveyed to the building drum 1 via conveying means 6, 7, 8 and 6', 7' and 8'. Each of the conveying means successively comprises a roller conveyor 6, 6', a conveyor belt 7, 7' and a mounting conveyor 8, 8' for mounting the belt strip onto the building drum. A cutting means 9, 9' is placed above every roller conveyor 6, 6' for cutting the belt material into a belt strip. The belt strips supplied by the conveying means 6, 7, 8 and 6', 7' and 8' are one by one wound around the building drum 1, such that a packet consisting of superimposed belt strips is built on the building drum 1.

The belt apparatus comprises determining means 10 which are placed at the transition from the roller conveyor 6 to the conveyor bell 7. These determining means 10 determine the shape of at least one side of the belt strip. The shape as determined of the at least one side is compared in comparison means (not shown) with the shape of a reference side concerned. For this purpose, the comparison means are connected to the determining means 10 and preferably comprise a first memory for storing the shape as determined of the at least one side of the strip, a second memory, for storing the shape of the at least one reference side concerned, calculating means for calculating the difference between the shape as determined of the at least one side and the shape of the reference side, and control means for controlling the adjusting means (not shown), depending on the calculated difference. These adjusting means adjust the shape of the at least one side to the reference side, depending on the calculated difference. In order to keep the drawing simple, only determining means 10 for belt material present on the upper conveying means 6, 7, 8 have been shown. It will be clear, however, that analogous determining means can be present at the lowest conveying means.

The building drum 1 can have various diameters, depending on the diameter of the pneumatic tire which is to be produced. The minimum diameter has been represented by a continuous line, the maximum diameter of the building drum 1 has been represented by interrupted lines. In order to allow for the manufacture of pneumatic tires having greatly differing diameters, the frame 11 of the building drum 1 is constructed such that building drums may exchangeably be mounted thereon.

Figure 3:
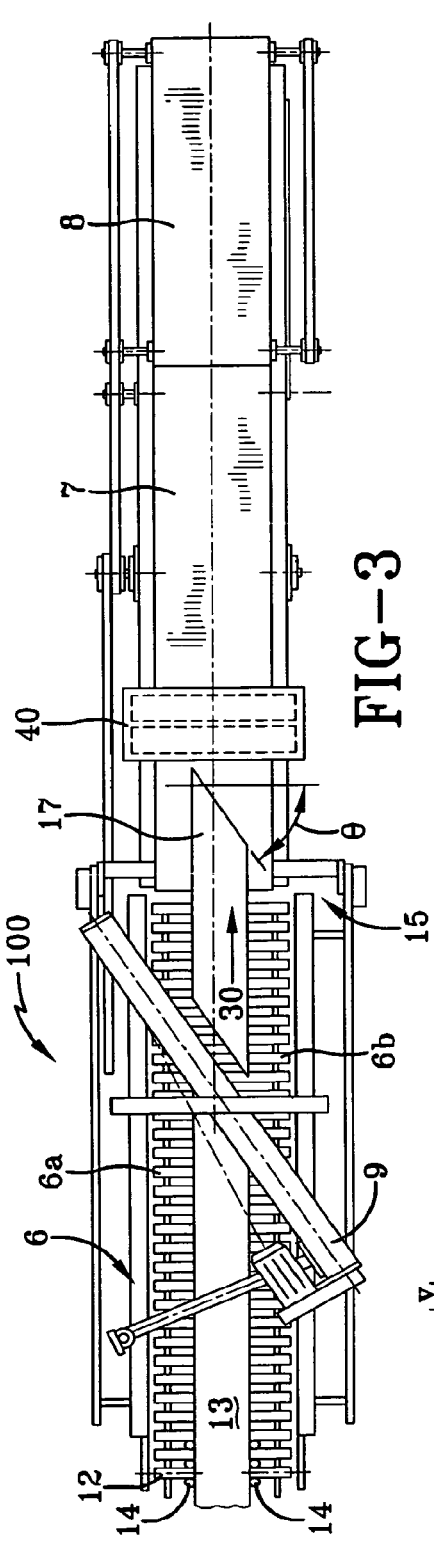
FIG. 3 is a top view of the exemplary apparatus of FIG. 1.

FIG. 3 shows a schematic lop view of a part of the belt strip feeding apparatus represented in FIG. 1. The roller conveyor 6 is built up by a number of bearing rollers 12, each of which is driven such that belt material 13 which is present on the roller conveyor 6 is conveyed to the conveyor bell 7. The belt material 13 is herein centered at the beginning of the roller conveyor 6 by guide rollers 14 on both sides of the bell material 13. When the belt material 13 has arrived in a position under adjustable cutting means 9, the belt material 13 is cut under an angle θ, which lies for instance between 18.degree. and 30.degree. When the bell material has been reinforced by steel cords running almost parallel to each other, said cords enclosing an acute angle with the imaginary centre line of the material, the belt material is preferably not fixed during cutting. As a result, the cutting means 9 can cut the belt material between the cords, without the steel cords becoming exposed.

After cutting, the roller conveyor 6 conveys the cut belt material 13 further in the direction of the conveyor belt 7, as shown in FIG. 3. The roller conveyor 6 comprises two parts 6a and 6b which can be coupled by means of an electro-magnetic coupling (not shown). The bearing rollers of the part 6a extend, at the cutting means 9, from one edge of the roller conveyor up to a distance from or up to the line of cut determined by the cutting means, such as for instance roller 12'. Opposite bearing roller 12' of part 6a a bearing roller (not shown) of part 6b extends up to the other edge of the roller conveyor. During further conveyance the belt material is pressed against guide rollers by a pressure roller (not shown) situated above.

When the belt material 13 passes the transition 15 between roller conveyor 6 and conveyor belt 7, then, as will be described in more detail later, at least one side of the belt material is adjusted to a reference side. When the belt material 13 has covered a distance from the cutting means 9 which corresponds to the desired length of a belt strip, then the conveyance of the belt material is stopped and the cutting means 9 are activated to cut the belt material, thus forming a belt strip. This belt strip 17 is further conveyed by part 6b of the roller conveyor 6 in the manner as shown in FIG. 3.

Figure 4:
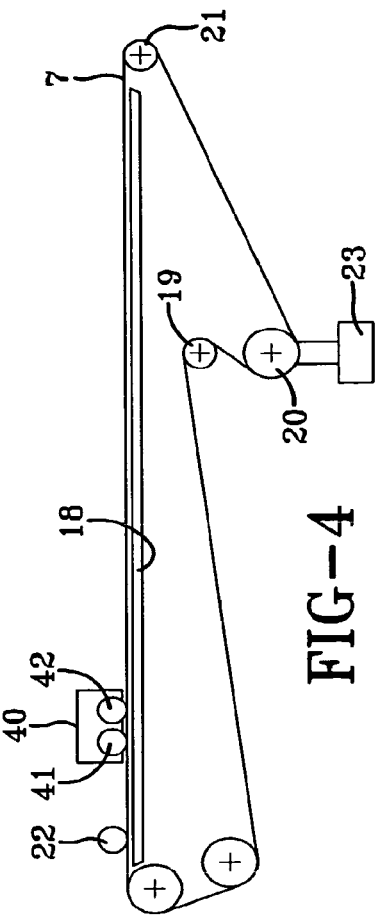
FIG. 4 is a schematic plan view of the conveyor means of the exemplary apparatus of FIG. 1.

When the belt material reaches the conveyor belt 7, the adjusted shape of the side is fixed by fixing means which fix the belt material on the conveyor belt 7. These fixing means can be formed for all types of belt material, so including non-ferro belt material, by pressures belts placed above the conveyor belt 7 or vacuum means below the conveyor bell 7. When the belt material has been reinforced with steel cords, the fixing means are preferably formed by magnets 18, as shown in FIG. 4. Depending on the surface of the belt strip present on the conveyor belt 7, great forces are exercised on the conveyor belt when the belt strip is pulled against the conveyor belt 7 by the magnets 18. If these forces become too great, the conveyor belt 7 could start to slip in an unchecked manner which would be harmful to the adjusted shape. In order to prevent the conveyor belt from slipping in an unchecked manner, the conveyor belt 7 should be driven without variations or with a constant (small) slip. A driving of the conveyor belt 7 without variations or with a constant (small) slip is for instance obtained by driving the conveyor belt 7 with three drivable drive rollers 19, 20, and 21. One of these drive rollers 21 is placed at the end of the conveyor belt 7 and two of these somewhere halfway the conveyor bell 7. These two drive rollers 19, 20 are positioned relative to each other in such a way that the conveyor belt 7 passes between them in an S-shape. Moreover, practice has shown that, depending among other things on the velocity of the conveyor belt relative to the permanent magnet 18, the conveyor belt 7 can execute a movement transverse to its direction of travel, which has a negative effect on the adjusted shape of the at least one side of the belt strip. By laterally confining the conveyor belt 7 by means for laterally restricting the freedom of movement of the conveyor belt 7, this negative effect is avoided. These means can be formed by raised edges between which the conveyor belt 7 is placed.

The conveyor belt 7 preferably comprises an encoder 22 for measuring the movement of the conveyor belt 7. Although there are other means for measuring the movement or shift of the conveyor belt, which measurement could be used to measure the shape of a certain side of the belt strip, an encoder is preferred because it provides a real time measurement. The conveyor belt is controlled by a drive unit 23 with an (other) encoder coupled thereto. In the present case, the drive rollers 19, 20, 21 are connected to the roller conveyor via geared belts, so that the (other) encoder also controls the movement hereof.

Although adjusting the shape of at least one side of a strip of flexible material, such as a belt strip, to a reference side concerned, may be carried out in the statical manner after determining the shape, as described in U.S. Pat. No. 4,608, 890, the invention will be described by means of a dynamic adjustment which takes place during the transition of the belt material from the roller conveyor to the conveyor belt. In such a dynamic adjustment, sections of the at least one side are successively adjusted to sections of the reference side concerned.

The cycle time for conveying the belt material, cutting the belt strip, adjusting the belt strip to a reference strip and further conveying it to a building drum turns out to be sufficiently short for mass production when the dynamic adjustment is carried out by moving the belt material 13 relative to the conveyor belt 7 transverse to the direction of conveyance 30 during the transition 15 of the belt material from the roller conveyor 6 to the conveyor bell 7. This relative transverse shift takes place by shifting the entire roller conveyor 6, on which the bell material 13 is situated, controlled by an electronic unit transverse to its direction of conveyance 30. As a result, the belt material situated on the roller conveyor 6 moves relatively vis a vis the conveyor belt 7, with encoder 22 and raised edges for confining the conveyor belt 7. The electronic unit controls the lateral shift of the roller conveyor, depending on the calculated difference between the shape of the at least one side of the belt material and the reference side.

After the belt strip 17 is cut and conveyed, separating the strip 17 from the belt material 17, a "wild wire" may be exposed partially separating from the elastomeric material of the belt. Heretofore, only a human visual detection was conducted to insure such a condition did not occur. The present invention strategically positions a means 40 for detecting such a wild wire condition in the cut ends of a belt strip 17 on the exemplary apparatus 100 or a similar type machine just after the means for cutting. As shown in FIG. 1 two such means 40, 40' are used one means 40 on the upper level and one means 40' on the lower level on the conveyor belts 7, 7' respectively.

Figure 2:
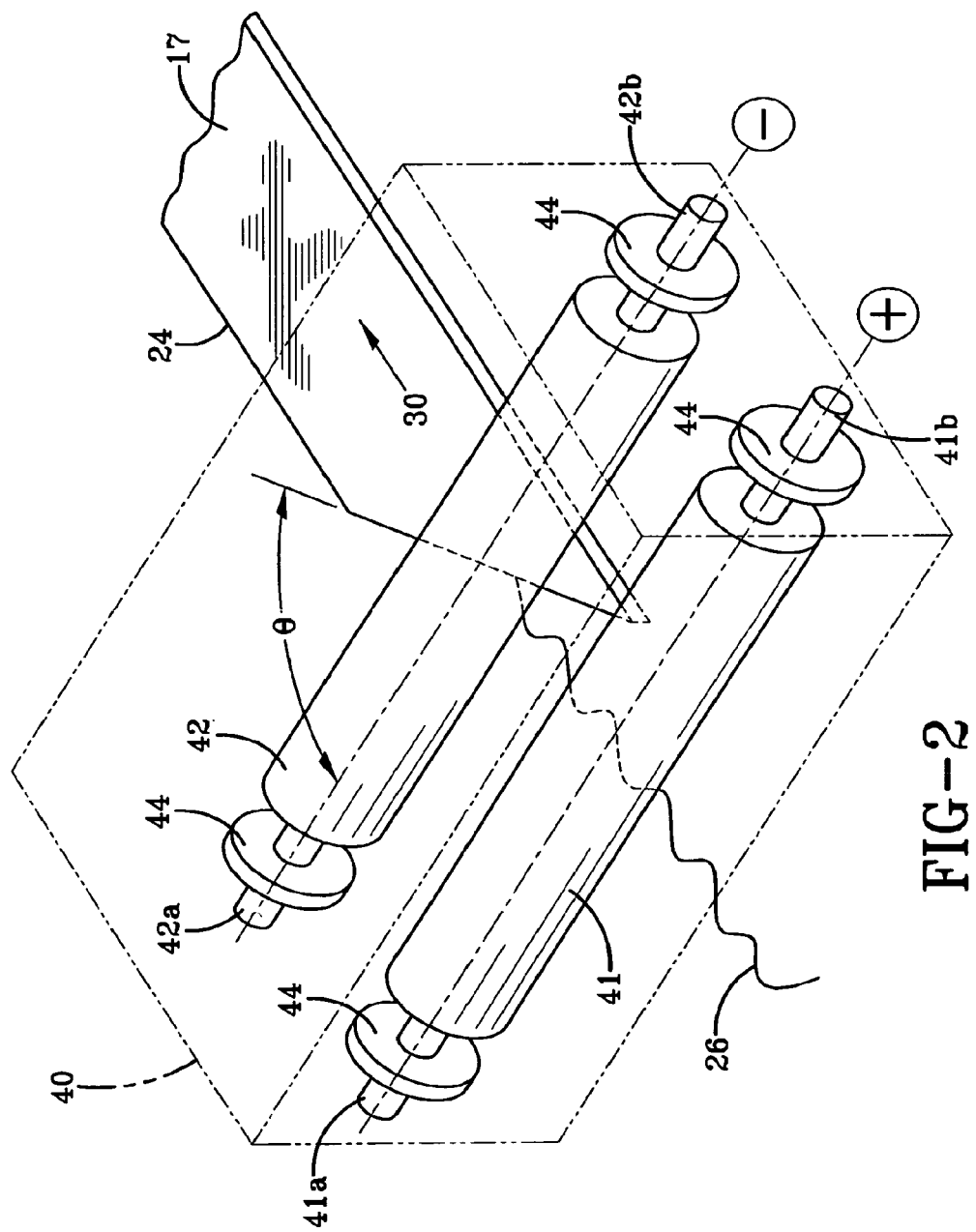
FIG. 2 is an enlarged perspective view of the wire detecting means of the present invention and a cut elastomeric strip having a separated wire.

With reference to FIG. 2 the bell strip 17 is shown passing under the means 40 for detecting a wild wire 26 which is exposed and partial by separated from the embedding rubber or elastomeric material 24 of the belt strip 17.

As shown the mounting housing is in dashed lines thus enabling the components of the means for detecting to be readily seen. A first roller 41 and a second roller 42 span the strip 17. As shown the rollers 43, 42 are oriented parallel and closely spaced. Preferably the space between the rollers is minimized to a very small gap, most preferably less titan a few millimeters. Each roller is electrically conductive wherein the rollers are part of an open electrical circuit having been connected to an electrical power source such as a battery (not shown). The small shaft ends 41a, 41b and 42a, 42b of the rollers 41 and 42 respectively are mounted in insulated bearings 44. The insulated bearings insure the two rollers are not grounded and therefore when the "wild wire" 26 touches both rollers 41 and 42 the circuit is closed as an electrical current passes down the wire 26 as long as it contacts both rollers.

The completion of the circuit by the wild wire 26 touching the two rollers 41, 42 enables a switch (not shown) to be turned stopping the apparatus 100 and thus alerting an operator to inspect and repair the belt strip 17. Alternatively the closing of the circuit can be used to signal the control computer to activate an alarm or otherwise stop the apparatus to enable the belt strip 17 to be repaired. As mentioned the wild wire 26 can be repositioned by reattaching the wire 26 to the material 24 or the wire can simply be removed.

As shown the rollers are oriented about 90° to the direction of conveyance. Alternatively the rollers can be oriented on a bias angle relative to the direction of conveyance. This is beneficial if a radial ply carcass ply is being made having metal cords as in truck tires. It is simply important that the rollers be oriented at an angle at least 15° or more relative to the cords to facilitate detection and contact of the exposed wire relative to the rollers.

In one embodiment the rollers are spring loaded to insure the exposed wire is pressed between the roller and the conveyor. In that case it is preferable that the rollers are oriented generally at the angle θ. This insures the rubber 24 embedding the cords 26 does not lift the rollers from solid contact with the cord 26. Typically the cords 26 are sufficiently large relative to the overall belt thickness such that the embedding rubber does not interfere with a good contact. Accordingly the roller bearings can be rigidly fixed to the housing.

Figure 5A:
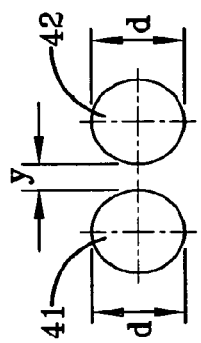
FIGS. 5A and 5B are end views, FIG. 5A being a pair of rollers used in the present invention and an alternative pair of rollers is shown in 5B.
Figure 5B:
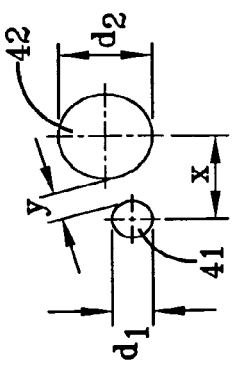

As illustrated in FIG. 5A the rollers 41, 42 have a diameter of 25 mm each and are spaced a distance of 30 mm. A design alternative could permit smaller diameters for the rollers or a combination of a smaller diameter roller with a larger diameter roller. Furthermore, in such a combination the centerline of the smaller diameter roller can be lower relative to the larger diameter roller to permit the gap distance to be further reduced as shown in the cross sectional views of FIG. 5B. The minimum gap y between the adjacent rollers is preferably 1 mm or more preferably about 5 mm thus enabling the distance x to be further reduced below 30 mm if so desired.

As noted the rollers are electrically conductive being made of steel, copper or brass whereas the bearings are made with an electrically insulated layer to prevent passing electricity from passing.

The sensor means 40 is readily installable on virtually any strip forming or conveying apparatus. To install the device 40 it is preferable to mount it so the breaker or belt can pass through the rollers 41, 42 completely. The height of the rollers should be established at the same height relative to the conveyor surfaces, preferably just touching the conveyor surface. The flexibility in the conveyor belt wilt allow the cut strip to freely pass under the rollers.

The fundamental principal of operation is as follows:
During breaker length measurement and transporting to ready position, the whole body of the breaker will go through underneath the detecting rollers, which one roller is powered with DC 24V, the other one is connected to the tire machine's Programmable Logic Controller (PLC) input. If a wild wire occurs, when it passes through the detecting rollers, if transfers 24 Volts from the powered roller to the other one and signals PLC and simultaneously activates an alarm horn. The Breaker will not be applied onto B&T Drum automatically, the operator must hit the Step Button to apply the Breaker after he removes the wild wire.

Variations in the present invention are possible in light of the description of it provided herein. While certain representative embodiments and details have been shown for the purpose of illustrating the subject invention, it will be apparent to those skilled in this art that various changes and modifications can be made therein without departing from the scope of the subject invention. It is, therefore, to be understood that changes can be made in the particular embodiments described which will be within the full intended scope of the invention as defined by the following appended claims.

What is claimed is:

1. An improved metal cord reinforced elastomeric strip cutting and feeding apparatus, comprising:
   a conveyor for conveying a metal cord reinforced elastomeric strip longitudinally to a tire drum;
   a cutter for cutting the metal cord reinforced elastomeric strip between parallel metal cords across the entire width of the strip to form a belt, breaker or ply component; and
   a sensor for detecting any metal cords or filaments that are exposed and partially separated from the elastomeric material at the cut ends of the strip, and wherein the exposed metal cords or filaments have an electric current pass through as the sensor is touched by an exposed and partially separated metallic wire or an exposed filament closing an otherwise open circuit;
   wherein the sensor for detecting further comprises:
   a pair of electrically conductive rollers, including a first roller and a second roller;
   a power source connected to said first roller;
   a switch or signal device connected to said second roller; and
   wherein the first and second rollers are closely spaced, but gapped to create the otherwise open circuit and when the exposed and partially separated metallic wire or filament contacts said first and second rollers simultaneously the otherwise open electric circuit is closed activating said switch or signal device, wherein the rollers are spring loaded to move into rotational contact with the metal cord reinforced strip moving on the conveyor and move away from said conveyor as the cut ends of the strip pass.

2. The apparatus of claim 1 wherein the power source is a battery.

* * * * *